UNITED STATES PATENT OFFICE.

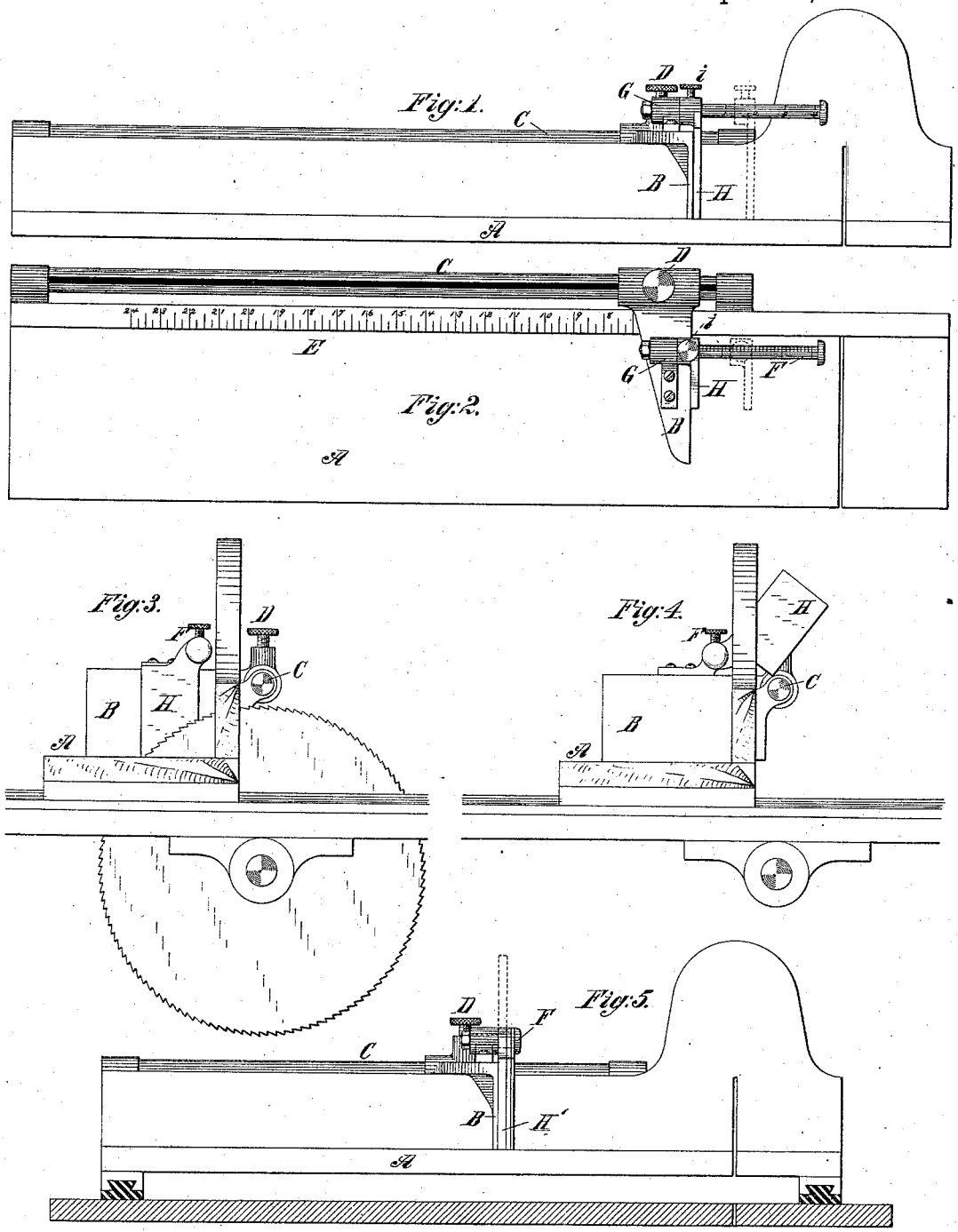

EMIL BAER, OF NEW YORK, N. Y.

SAW-TABLE GAGE.

SPECIFICATION forming part of Letters Patent No. 305,563, dated September 23, 1884.

Application filed July 5, 1884. (No model.)

*To all whom it may concern:*

Be it known that I, EMIL BAER, of the city, county, and State of New York, have invented a new and useful Improvement in Gages for Sawing-Machines; and I do hereby declare that the following is a full and exact description thereof, reference being had to the accompanying drawings, and to the letters of reference marked thereon, making a part of this specification.

My invention relates to gages for sawing-machines to determine the width of the strip to be cut by the saw.

In cutting out the boards or strips for the manufacture of boxes, especially cigar-boxes, and other articles constructed of several pieces of different determinate widths, the cutting of each separate width has heretofore been gaged to produce exact uniformity therein by an adjustable gage-plate adapted to be moved to and from the saw, and which when adjusted is fixed by a set-screw or other device. This form of gage necessitates a change in its adjustment for each width of stuff to be cut, not only involving thereby a loss of time in making the adjustment, but likewise the risk of loss by reason of mistakes in setting the gage.

The object of my invention is to avoid this loss of time and of material in changing the adjustment of the gage; and it consists in providing as an auxiliary to the ordinary gage-plate an independent adjustable gage-plate, or a series of independent gage-plates, each so pivoted or arranged as to admit of being readily, and without change of adjustment, either thrown up out of the way of the piece of stuff to be sawed, or at pleasure dropped into position to serve as a positive gage determining the width of the strip to be cut from said piece.

In the accompanying drawings, Figure 1 is an elevation of a sawing-table having my device applied thereto, the saw not being shown; Fig. 2, a plan view of the same; Fig. 3, an end view, with the saw in place and the auxiliary gage dropped; Fig. 4, a similar view with the saw removed, illustrating the auxiliary gage swung up out of the way; Fig. 5, a front elevation of the saw-table with the saw removed, illustrating a modification of my invention.

A represents the movable table of a circular sawing machine of any approved construction; B, its adjustable gage fitted upon a longitudinal rod, C, fixed at a right angle to the plane of the saw. The gage is adapted to slide back and forth along this supporting-rod to and from the saw, and is fixed when adjusted by means of a set-screw, D, or other device, in the customary manner. E is a scale, by means whereof the adjustment of the gage B may be regulated and determined with accuracy, so that it shall serve as a guide in sawing out with exactness boards or strips to any desired width noted upon the scale.

Ordinarily, in sawing out a set of boards of different widths, the gage is set to determine the width of one set. After these have been sawed the gage is moved and set by the scale to determine the width of the next lot, and so on. The necessity of this constant change of adjustment by a movement of the gage to or from the saw is obviated by means of my auxiliary attachment, which consists, preferably, of a rod, F, supported to rotate in a suitable bearing, G, secured upon the top of the adjustable gage B, (see Fig. 2,) so as to project therefrom toward the saw in line parallel with the supporting-rod C, and at a right angle to the plane of the saw. While free to rotate upon its axis in its bearing G, this rod F may be also adapted, by means of suitable devices, to have a longitudinal movement for adjustment to and from the saw, and be fixed when adjusted by a suitable set-screw, in manner as is the main rod C; but in the drawings the rod F is represented as immovable longitudinally, although free to rotate as described. This rotating rod serves as a pivot for an auxiliary gage-plate, H, adapted to drop and rest edgewise upon the saw-table A, parallel with the main gage-plate B, and between it and the saw. The upper rear corner of the plate is constructed with an offset projecting sufficiently to embrace the rod F, to which it is so fitted as that the plate may be moved longitudinally upon the rod to and from the saw, and be secured when adjusted by means of a set-screw, *i*, (see Figs. 1 and 2,) or other suitable device. When thus secured, it may be readily swung up entirely clear of the table, the rotating rod F serving as its pivotal axis. The rod F is graduated and marked with a scale to facilitate the accurate adjustment of the auxiliary gage. In the use of the auxiliary gage as thus mounted, the principal gage-plate B having been properly adjusted and fixed to determine the width of one set of boards or strips to be sawed, the auxiliary gage-plate H is moved upon its rod to such point relatively to the saw as will determine the width of the second set of boards or strips. After being thus set it may be thrown up out of the way of the first gage, as shown in Fig. 4, until required for use, when it is brought instantly into play by turning it down into place, as shown in Fig. 3. Where it is required to gage in sawing a number of sets of boards of different widths, I provide a series of gage-plates, H' H', (see Fig. 5,) of different widths, pivoted upon a fixed rod, F, or which are fixed at different intervals upon a rotating rod serving as a pivotal axis therefor. In this case it is only necessary after using one gage to drop the next, and the next, and so on, as required for the several widths to be cut, the change of gage being thus effected without loss of time and without danger of mistake in the adjustment of the gage, which remains positive and exact.

It is evident that although the pivoting of the auxiliary gages upon a rod as a ready means of throwing them in and out of place upon the table constitutes a simple, ready, and convenient device for the purpose, other obvious equivalent methods of moving the gages may be employed—as, for example, by arranging them to slide to and from the table, either vertically or at an inclination, in suitable ways elevated above the table, and I contemplate a movement of the auxiliary gages to and from the table in any suitable manner which will not interfere with the use of the original gage.

It is evident, also, that the rod F, carrying the auxiliary gages, may be arranged to move longitudinally in its bearings to permit of the adjustment of the gage fitted thereto to and from the saw, the gage being free to rotate on the rod, but not move longitudinally thereon, and also that the gage may be fitted to rotate upon a collar fitted to move for adjustment to and from the saw upon a fixed rod, F. As the auxiliary gages are attached to the main gage, they partake of its adjustment and are simply accessories thereto.

I claim as my invention—

1. The combination, with the table, the saw, and the main gage of a sawing-machine, of one or more supplemental gages, each mounted to move independently to and from the table between the main gage and the saw, and to rest thereon, each in a plane parallel with the face of the saw, substantially in the manner and for the purpose herein set forth.

2. The combination, in a sawing-machine, with its table, a saw working through the same, and a main gage mounted thereon, of a pivotal rod carried by the main gage B at a right angle to the face of the saw, and one or more supplemental gages pivoted upon said rod to swing to and from the table and rest thereon, each in a plane parallel with the face of the saw, substantially in the manner and for the purpose herein set forth.

3. The combination, in a sawing-machine, with its table and the saw working through said table, of a main gage, B, adjustable upon the table to and from the saw in a line at a right angle to the face of the saw, and of one or more supplemental gages, H H', adjustable to and from the main gage B, between it and the saw, upon a pivotal rod, F, on which they are free to swing to and from the table, each in a plane parallel with the face of the saw, substantially in the manner and for the purpose herein set forth.

In testimony whereof I have signed my name to this specification in the presence of two subscribing witnesses.

EMIL BAER.

Witnesses:
 A. B. MOORE,
 E. C. PERKINS.